Feb. 10, 1942.  P. E. HOVGARD  2,272,173
CONTROL AIRFOIL
Filed April 26, 1940

INVENTOR
PAUL E. HOVGARD
BY
ATTORNEY

Patented Feb. 10, 1942

2,272,173

UNITED STATES PATENT OFFICE 2,272,173

CONTROL AIRFOIL

Paul E. Hovgard, Kenmore, N. Y., assignor to Curtiss-Wright Corporation, a corporation of Delaware Application April 26, 1940, Serial No. 331,721

8 Claims. (Cl. 244—87)

The present invention relates to improvements in the form of control airfoils for aircraft, particularly to that type of airfoil which moves about an axis to either side of a stabilizing airfoil disposed forwardly of the control airfoil. In particular, the improved control airfoil of the invention is applicable to rudders, elevators, and to some extent, ailerons of aircraft.

There have been numerous teachings in the prior art purporting to provide improved control effectiveness and reduced control loads, but in many cases, the provisions of the prior art cause increases in drag of the assembly. For instance, slots or gaps between the movable and fixed airfoils in conjunction with special shapes of the leading edge of the movable airfoil may have a beneficient effect upon controllability and loads, but ordinarily cause an increase in drag due to the gaps. It is an object of this invention to provide a control airfoil arrangement which shall eliminate to a large extent any additional drag, but which shall at the same time afford reduced control loads at substantial displacement angles of the airfoil while allowing a high degree of control effectiveness.

Further objects of the invention will be apparent from a reading of the annexed detailed description in connection with the drawing, in which.

In prior practice it has been common to always make the depth or thickness of the movable control airfoil equal to or less than the depth or thickness of the trailing edge of the stabilizing airfoil adjacent which the control airfoil is hinged, on the basis that air flow over the stabilizing airfoil may continue smoothly over the control airfoil with a minimum increase in drag. However, as slots or gaps between the airfoils have come into being to afford improved controllability, such slots or gaps introduce a substantial amount of drag so that the smooth air flow desired may not actually be obtained. I have found that the uniformity of thickness of the trailing edge of the stabilizing airfoil and the leading edge of the controlling edge airfoil is in no wise necessary and that rather, elimination of the gap between the airfoils and a thickening of the leading edge of the control airfoil produces substantially improved results both as to drag reduction and as to controllability and uniformity of control forces.

Figure 1:
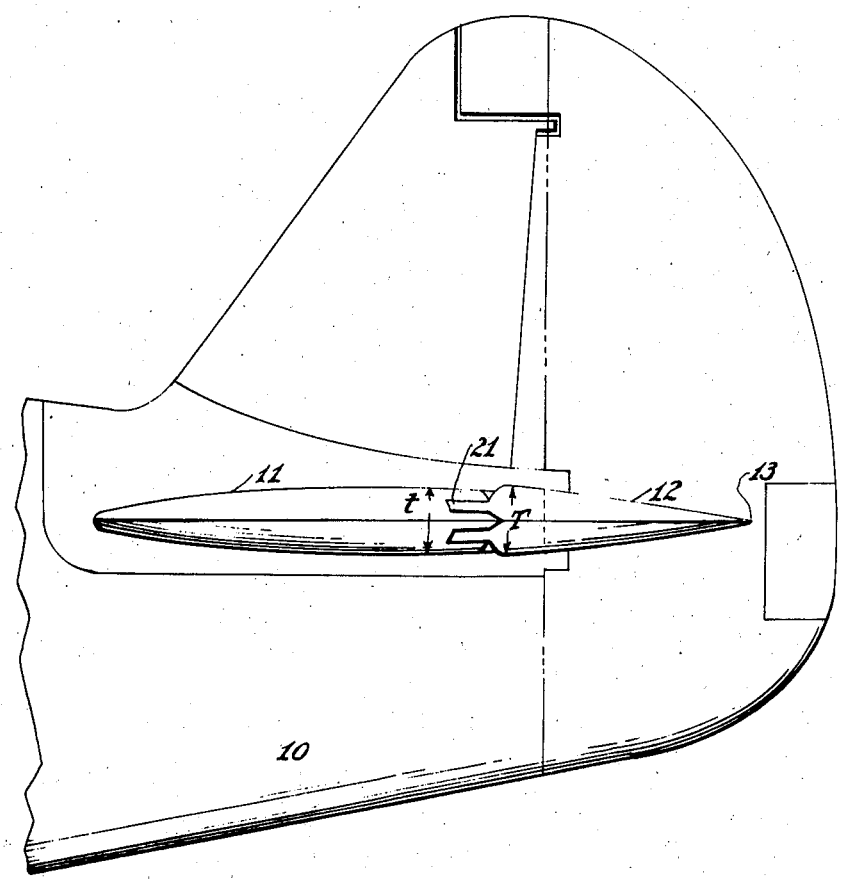
Fig. 1 is a side elevation of an aircraft empennage.

Fig. 1 shows a tail end 10 of an aircraft fuselage from which extends a horizontal stabilizer 11 whose thickness toward the trailing edge is indicated by the dimension $t$. Adjacent the trailing edge of the stabilizer 11 a movable elevator 12 is hinged, the thickness of the leading edge thereof designated by the letter $T$ being somewhat greater than $t$, the profile of the elevator tapering rearwardly to a relatively sharp leading edge 13. The front end of the elevator 12 is smoothly curved, as shown in Fig. 2, so that there is a fairly gradual blending from the trailing edge of the stabilizer to the leading edge of the elevator without abrupt projections which would, of course, tend to increase aerodynamic drag.

Figure 2:
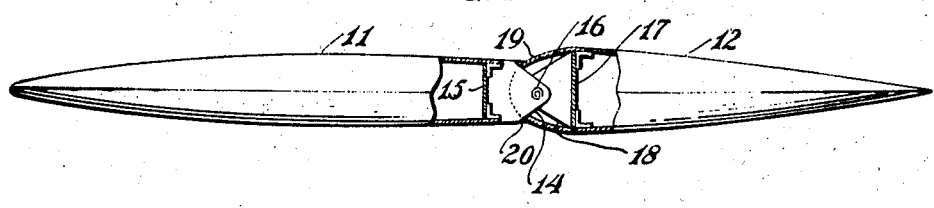
Fig. 2 is a side elevation partly in section, showing a particular arrangement of the stabilizing air foil and control airfoil.

Referring to Fig. 2, a bracket 14 extends rearwardly from a rear structural member 15 of the stabilizer 11, to which the elevator 12 is hinged at 16, the elevator being provided with a structural member 17 carrying a forward projection 18 which comprises the hinged member. The forward end of the elevator 12, as at 19, is arcuate in form and substantially concentric with the hinge 16, so that trailing fairings 20 of the stabilizer 11 may terminate in close clearance relation with the elevator nose 19 and, when the elevator 12 is displaced to either side of its neutral position, this small clearance is maintained to afford minimum gap between the stabilizer and elevator with consequent minimum drag occasioned by gap. The bulged nose of the elevator 12 allows of displacement to either side of neutral without affecting the gap and the bulged nose likewise occasions substantially no increase in drag in spite of the interference to a smooth profile occasioned thereby, since the drag of the system has been initiated by the leading edge of the stabilizer 11. The lack of drag increase can be appreciated by comparing the system with flying wires in tandem—the drag of two flying wires in tandem is well known to be no greater and sometimes less than the drag of one wire alone.

The particular disposition of the hinge axis with respect to the bulge of the elevator leading edge is not considered to be dominant in importance—aerodynamic balance of the elevator may be secured by a forwardly projecting portion such as 21 in the conventional manner, and substantial aerodynamic balance is secured by the bulge on the downstream side of a displaced elevator, since impact of air upon the bulge, rearward of the hinge, produces a force component tending to move the elevator in an upstream direction. With the elevator neutral the force is equal on both sides thereof so that no servo effect is secured. The theoretical reasons for the improvements afforded by my invention are somewhat obscure, but regardless of reasoning, experimental results both in wind tunnel and on full scale aircraft have indicated reduction in drag evidenced by a three mile per hour increase in speed on a high speed airplane, and by the fact that control is more effective at large angles of displacement than it has been on previous arrangements of control airfoils. In general, the indication is that the forward one-third of the elevator or control surface chord should have a bulged contour, while the rearward two-thirds should have straight sides or substantially straight sides tapering to the sharp trailing edge. The bulge proper may be rearward of the hinge axis and the mean thickness of the bulge is in general farther to the rear of the hinge than has been contemplated in certain prior art arrangements in which a bulge appears on the downstream side of the control airfoil when the airfoil is displaced.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A control airfoil assembly comprising a forward stabilizer terminating in a trailing edge having material thickness, and a hinged control airfoil having an arcuate leading edge portion close to the stabilizer trailing edge surfaces, the arc of the leading edge extending outside of a continuation of the stabilizer trailing edge profile whereby the forward portion of the control airfoil is thicker than the stabilizer trailing edge, the control airfoil having a straight surface profile tangent to said leading edge portion to its trailing edge.

2. A control airfoil assembly comprising a forward stabilizer terminating in a trailing edge having material thickness, a hinged control airfoil having an arcuate leading edge portion close to the stabilizer trailing edge surfaces, the arc of the leading edge extending outside of a continuation of the stabilizer trailing edge profile whereby the forward portion of the control airfoil is thicker than the stabilizer trailing edge, the control airfoil having a straight surface profile from its leading edge to its trailing edge, and a hinge for the control airfoil concentric with said arcuate leading edge portion.

3. A control airfoil assembly comprising a stabilizer having substantial thickness at its trailing edge and a reentrant recess between the opposed surfaces at the trailing edge, a control airfoil having an arcuate nose nested in said recess, portions of the arcuate nose extending outwardly from a continuation of the stabilizer profile, and a hinge for the control airfoil having its axis concentric with the arcuate nose.

4. A control airfoil assembly comprising a stabilizer having substantial thickness at its trailing edge and a reentrant recess between the opposed surfaces at the trailing edge, a control airfoil having an arcuate nose nested in said recess, portions of the arcuate nose extending outwardly from a continuation of the stabilizer profile, a hinge for the control airfoil having its axis concentric with the arcuate nose, the part of the control airfoil rearward of the leading edge being bulged to provide greater control airfoil thickness at and rearward of the hinge than the thickness of the stabilizer.

5. A control assembly for aircraft comprising a forward airfoil having a recessed trailing edge, means providing a hinge axis rearward of and substantially equidistant from the edges of said recess, and a movable airfoil mounted for movement about said hinge axis, said movable airfoil having a leading arcuate portion substantially concentric with said hinge axis and nested in said recess whereby, when displaced, the distance between the edges of said recess and said arcuate surface remains substantially constant.

6. A control assembly for aircraft comprising a forward airfoil having a recessed trailing edge, means providing a hinge axis rearward of and substantially equidistant from the edge of said recess, and a movable airfoil mounted for movement about said hinge axis, said movable airfoil having a leading arcuate portion substantially concentric with said hinge axis and nested in said recess whereby, when displaced, the distance between the edges of said recess and said arcuate surface remains substantially constant, said movable airfoil forward portion having a thickness in the vicinity of its hinge axis greater than the thickness of the forward airfoil at its trailing edge.

7. A control assembly for aircraft comprising a forward airfoil and a rearward movable airfoil hinged thereto, said airfoils in the region of the hinge axis having profiles characterized as follows: The forward airfoil rear portion is recessed to define two spaced trailing edges; the hinge axis is between and rearward of said edges; and the movable airfoil includes an arcuate leading portion concentric with the hinge axis and said leading portion is thicker than the rear part of the forward airfoil.

8. A control assembly for aircraft comprising a forward airfoil and a rearward movable airfoil hinged thereto, said airfoils in the region of the hinge axis having profiles characterized as follows: The forward airfoil rear portion is recessed to define two spaced trailing edges; the hinge axis is between and rearward of said edges; the movable airfoil includes an arcuate leading portion concentric with the hinge axis and said leading portion is thicker than the rear part of the forward airfoil; and said movable airfoil includes surfaces tangent to said arcuate portion and extending rearwardly to the movable airfoil trailing edge.

PAUL E. HOVGARD.